Patented May 16, 1950

2,507,546

UNITED STATES PATENT OFFICE 2,507,546

PROCESS FOR PRODUCING MYRCENE FROM BETA-PINENE

Theodore R. Savich, Library, Pa., and Leo A. Goldblatt, New Orleans, La., assignors to the United States of America as represented by the Secretary of Agriculture No Drawing. Application April 2, 1948, Serial No. 18,704

8 Claims. (Cl. 260—677)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to an improvement in the vapor phase thermal isomerization of beta-pinene to produce myrcene. Myrcene is a useful intermediate in the manufacture of many different types of material. Since it is a polyolefin with 3 double bonds, two of which are in terminal conjugation, it can be used in the chemical industry in many reactions. For example, it can be substituted for butadiene or isoprene in the manufacture of synthetic rubber, or it can be reacted with dibasic acids such as maleic anhydride to form resins, or it can be hydrated to produce polyhydric alcohols suitable for use in perfume bases. Other uses are well known to those skilled in the art.

It is known to produce myrcene from beta-pinene by means of a noncatalytic thermal isomerization reaction in the vapor phase. Such a process was described by Goldblatt and Palkin in the Journal of the American Chemical Society, volume 63, pp. 3517-22 (1941). They reported that the "optimum" reaction temperature was 403° C.

An object of this invention is to provide a method of isomerizing beta-pinene to myrcene whereby the yield of myrcene is as much as 85 percent of the beta-pinene treated. It is a further object of this invention to produce myrcene which is practically free from or contains little polymer. It is another object of this invention to provide a method of producing myrcene at a relatively high rate in a small reactor system.

Contrary to the teaching of the Journal of the American Chemical Society citation, we have discovered that much higher yields of myrcene are obtained at higher temperatures provided that the contact time is very short. The contact time is the time of residence in the reactor, being the time interval during which the vapor is subjected to the higher temperature. Our preferred contact time is less than 0.10 second and, preferably, about 0.01 second or less. The space velocity is preferably above 100. By space velocity is meant the number of cubic centimeters of $\beta$-pinene vapor passing through per cubic centimeter of reactor space per second. The volume of the vapor, is cubic centimeters, is calculated at the temperature and pressure in the reactor.

In our process the yield of myrcene in a single pass through the reactor is as much as 85 percent of the theoretical yield, that is, 85 percent of the beta-pinene passed through is converted to myrcene.

A further advantage of our process is that the myrcene is produced with very low yields of the undesired polymer. The yield of polymer can be reduced to less than one percent.

Our preferred process comprises subjecting vapors of beta-pinene, i. e., nopinene, or a turpentine fraction rich in nopinene, to a temperature above 700° C. for a period of less than one-tenth of a second, preferably less than one-hundredth of a second, to obtain a high yield of myrcene and less than one percent of the polymer. In the process described in the Journal of the American Chemical Society citation, the dimer of myrcene, alpha-camphorene, is formed. In our process the yield of the dimer is markedly reduced.

The examples described below are intended to illustrate but not to limit the scope of our invention.

Example I

A reactor was set up which consisted of an unfilled steel pipe having a length of 30 cm., a reactor volume of about 0.5 cc., and an internal diameter of about 1.4 mm. The reactor was placed inside a steel block which was heated in an electric furnace. A thermocouple was inserted along the reactor tube for determining the reaction temperature. Liquid beta-pinene was pumped through an electrically heated tube in which is was vaporized and preheated to a temperature of 275° C. The preheated beta-pinene vapors were then passed through the reactor tube which was maintained at temperatures of 661° to 662° C. The throughput was maintained at such rate that the contact time was 0.01 second. The space velocity was 100. The pressure at the outlet of the reactor tube was atmospheric. The pressure at the inlet end of the reactor tube was sufficiently higher than atmospheric to force the vapors through the tube at the rate stated. The throughput was 350 grams per hour. The vapors leaving the reactor tube were led through a water cooled condenser, and the condensate was collected in a suitable receiver. The condensate was carefully distilled through a fractionating column having 100 theoretical plates. The yield of myrcene amounted to 80 percent of the beta-pinene put through. There was obtained only 1.5 percent of low boiling material which was probably isoprene (not identified) and only 1.5 percent of polymer. No unreacted beta-pinene was found in the condensate, showing that all the beta-pinene put through the reactor was converted.

In this example, and in the examples below, the contact time can be varied in the range 0.10 to 0.007, and even lower, by regulating the rate at which the liquid beta-pinene was pumped into the vaporizer and preheater. The steel pipe may be replaced by other materials, such as a ceramic or quartz tube. Reaction tubes of much larger diameter may be used, sufficient heat transfer surface being provided by conventional means, and sufficiently high throughput being maintained. Pressures below atmospheric may also be used. If the pressure is increased the throughput should be increased to obtain the desired contact time, and with avoidance of polymerization.

*Example II*

In the same reactor tube described for Example I, β-pinene vapor was put through at a temperature of 725° to 750° C. The pressure at the exit of the reactor tube was 5 mm. of mercury, maintained by a vacuum pump. The pressure at the reactor tube inlet was substantially atmospheric. The vapors were preheated as in Example I. Analysis of the condensate showed a yield of myrcene equal to 85 percent of the β-pinene put through and only 0.8 percent polymer. The contact time was 0.004 second and the space velocity was 290. 425 grams of beta-pinene were put through per hour. This throughput may be increased, to decrease the contact time.

*Example III*

In the same reactor described for Example I, 87 grams of beta-pinene per hour were put through at a temperature of 592° to 595° C. The vapors were preheated as in Example I. The pressure at the exit end of the reactor tube was atmospheric. The pressure at the inlet end was somewhat higher than atmospheric, being sufficiently higher to force the beta-pinene vapors through at the rate stated. The space velocity was about 24. The contact time, that is, the time required to traverse the reaction zone of high temperature, was about 0.04 second. Analysis of the condensate showed a yield of myrcene equal to 75 percent of the beta-pinene put through, together with 3 percent polymer and 2.5 percent isoprene.

A significant feature of the present invention lies in the extremely large increase in the throughput for a given reactor, compared with the throughput by previously known processes. For example, under their optimum conditions Goldblatt and Palkin put 175 grams of beta-pinene per hour through a reactor having a volume of approximately 315 cc. (at a calculated contact time of more than 8 seconds). In the present invention we have put 425 grams of beta-pinene per hour through a reactor having a volume of only 0.5 cc. This represents an increase of over 1,500 fold.

Turpentine fractions rich in nopinene (beta-pinene) may be used in our process. Beta-pinene of about 95 percent purity or higher is also used in our process. Purified beta-pinene having the physical characteristics described in the Journal of the American Chemical Society citation on page 3520, last five lines of the second column, can be employed in the above examples.

The fractionation of the reaction product condensate, or of the reaction product vapors, is carried out in the manner described in the Journal of the American Chemical Society citation on page 3521.

The above examples are not to be construed as exhausting the range of the invention. Lower temperatures such as above about 580° C. or even lower may be used. Reaction or contact times of the order of less than eight seconds are within the broader purview of our teaching, without derogating the criticality of far shorter contact times correlated with higher temperatures to obtain optimum results.

The terms "less than one percent of the polymer," "1.5 percent of low boiling material," "3 percent polymer," and the like, define the yield of polymer or of low boiling material based upon the total products obtained in the reaction.

Operation at temperatures much higher than 750° C., viz. at 900–1000° C., would have no advantage over operation at 750° C. The preferred upper limit is not much above 750° C., whereby excessive formation of low boiling material (isoprene) is avoided.

Having thus described our invention, we claim:

1. A non-catalytic method of producing myrcene comprising passing nopinene vapor over a period of about one-hundredth of a second or less through a reaction zone maintained at a temperature above 700° C.

2. A non-catalytic method of producing myrcene comprising passing nopinene vapor over a period less than one-tenth of a second through a reaction zone maintained at a temperature of about 580° to 750° C.

3. A non-catalytic method of producing myrcene comprising passing nopinene vapor over a period less than one-tenth of a second through a reaction zone maintained at a temperature above about 660° C.

4. A non-catalytic method of producing myrcene comprising passing nopinene vapor through an unfilled reaction zone having a lateral dimension of the order of less than two millimeters over a period less than one-tenth of a second maintained at a temperature above 580° C. at a space velocity no lower than about 100.

5. A non-catalytic method of producing myrcene comprising isomerizing nopinene by passing nopinene vapor over a period less than one-tenth of a second through a reaction zone maintained at a temperature above about 580° C., and promptly cooling the reaction vapor to a liquid condensate.

6. A non-catalytic process of producing myrcene comprising passing nopinene vapor through a reaction zone comprising a void space having a diameter less than one percent of its length over a period less than one-tenth of a second maintained at a temperature above 580° C. at a space velocity no lower than about 100.

7. A non-catalytic method of producing myrcene comprising passing nopinene vapor over a period of about .004 second through a reaction zone maintained at a temperature of about 725° to 750° C., the space velocity being about 290, and promptly cooling the reaction vapor.

8. A non-catalytic method of producing myrcene comprising passing nopinene vapor over a period of about .01 to .004 second through a reaction zone maintained at a temperature of about 660° to 750° C. and promptly cooling the reaction vapor.

THEODORE R. SAVICH.
LEO A. GOLDBLATT.

REFERENCES CITED

The following references are of record in the file of this patent:

UNITED STATES PATENTS

| Number | Name | Date |
|---|---|---|
| 2,420,131 | Goldblatt et al. | May 6, 1947 |
| 2,444,790 | Rummelsburg | July 6, 1948 |

OTHER REFERENCES

Goldblatt et al., J. A. C. S., 63, 3517 to 3522.